United States Patent [19]
Uhm et al.

[11] Patent Number: 5,949,835
[45] Date of Patent: Sep. 7, 1999

[54] STEADY-STATE, HIGH DOSE NEUTRON GENERATION AND CONCENTRATION APPARATUS AND METHOD FOR DEUTERIUM ATOMS

[75] Inventors: Han S. Uhm; Woodrow W. Lee, both of Potomac, Md.

[73] Assignee: The United States of America as represented by the Secretary of the Navy, Washington, D.C.

[21] Appl. No.: 07/724,083

[22] Filed: Jul. 1, 1991

[51] Int. Cl.$^6$ ..................................................... G21G 4/02
[52] U.S. Cl. ........................... 376/114; 376/115; 376/151
[58] Field of Search .................................. 376/100, 114, 376/115, 146, 151, 916, 103, 156

[56] References Cited

U.S. PATENT DOCUMENTS

| | | | |
|---|---|---|---|
| 2,489,436 | 11/1949 | Salisbury | 376/109 |
| 3,571,594 | 3/1971 | Nobel | 376/114 |
| 3,786,258 | 1/1974 | Schmidt | 376/115 |
| 3,816,785 | 6/1974 | Miller | 376/151 |
| 3,924,137 | 12/1975 | Alger | 376/151 |
| 3,963,934 | 6/1976 | Ormrod | 376/151 |
| 4,076,990 | 2/1978 | Hendry et al. | 376/115 |
| 4,210,813 | 7/1980 | Romanovsky et al. | 376/115 |
| 4,830,813 | 5/1989 | Dance | 376/114 |

FOREIGN PATENT DOCUMENTS

| | | | |
|---|---|---|---|
| 393465 | 10/1990 | European Pat. Off. | |
| 90/10935 | 9/1990 | WIPO | 376/100 |
| 90/15415 | 12/1990 | WIPO | |

OTHER PUBLICATIONS

Huizenga, "Cold Fusion: The Scientific Fiasco of the Century", University of Rochester Press, 1992, pp. 22–41, 58–83, 86–91, 128–189, 200–223, 240–259.
The Washington Times, Mar. 24, 1989, p. A5, article by D. Braaten.
The New York Times, May 3, 1989, pp. A1, A22, article by M. Browne.
J. Electroanal. Chem. vol. 266, (1989) pp. 437–450, Kreysa et al.
J. of Nucl. Sci. and Tech., vol. 26, No. 7, (Jul. 1989), pp. 729–732, Ohashi et al.
Science, vol. 246, No. 4931, Nov. 10, 1989, pp. 793–796, Miskelly et al.
Nature, vol. 340, Aug. 17, 1989, pp. 525–530, Lewis et al.
UCRL–101583, Jul. 1989, Chapline, pp. 1–9.
The Wall Street Journal, Apr. 26, 1989, p. B4, article by D. Stipp.
The Washington Post, May 2, 1989, pp. A1, A7, article by P. Hilts.
The Washington Post, Jul. 13, 1989, p. A14.
Z. Phys. A.—Atomic Nuclei, vol. 333, (1989) pp. 319–320, Alber et al.
ORNL/FTR–3341, Jul. 31, 1989, pp. 2–15, Cooke.
J. Radioanal. Nucl. Chem., Letters, vol. 137, No. 1, (Aug. 21, 1989), pp. 23–28, Horanyi.
J. Radioanal. Nucl. Chem., Letters, vol. 137, No. 1, (Aug. 21, 1989), pp. 9–16, Faller et al.
Solid State Communications, vol. 72, No. 4, (1989) pp. 309–313, Hajdas et al.

(List continued on next page.)

*Primary Examiner*—Daniel D. Wasil
*Attorney, Agent, or Firm*—John Forrest; Jacob Shuster

[57] ABSTRACT

A steady-state source of neutrons is produced within an electrically grounded and temperature controlled chamber confining tritium or deuterium plasma at a predetermined density to effect implantation of ions in the surface of a palladium target rod coated with diffusion barrier material and immersed in such plasma. The rod is enriched with a high concentration of deuterium atoms after a prolonged plasma ion implantation. Collision of the deuterium atoms in the target by impinging ions of the plasma initiates fusion reactions causing emission of neutrons during negative voltage pulses applied to the rod through a high power modulator. The neutrons are so generated at a relatively high dose rate under optimized process conditions.

8 Claims, 4 Drawing Sheets

OTHER PUBLICATIONS

Physical Review Letters, vol. 62, No. 25, Jun. 19, 1989, pp. 2929–2932, Ziegler et al.

Z. Phys. B—Condensed Matter, vol. 76, No. 2, pp. 141–142, (1989), Schrieder et al.

Physical Review Letters, vol. 63, No. 18, Oct. 30, 1989, pp. 1926–1929, Price et al.

Physics Letters B, vol. 228, No. 1, Sep. 7, 1989, pp. 163–166, Cribier et al.

Solid State Communications, vol. 72, No. 1, (1989) pp. 53–57, Shani et al.

The Washington Post, Mar. 29, 1990, p. A3.

Nature, vol. 344, Mar. 29, 1990, pp. 401–405, Salamon et al.

Besenbacher et al, Journal of Fusion Energy, vol. 9, No. 3, Sep. 1990, pp. 315–317.

Myers et al, Journal of Fusion Energy, vol. 9, No. 3, Sep. 1990, pp. 263–268.

STEADY-STATE, HIGH DOSE NEUTRON GENERATION AND CONCENTRATION APPARATUS AND METHOD FOR DEUTERIUM ATOMS

BACKGROUND OF THE INVENTION

A need exists for a reliable neutron source in various applications, including calibration, detection and radiography. For example, there is at present an on-going worldwide effort to develop a high-intensity neutron source for neutron radiography with respect to material surfaces or bulk objects. Plasma focus machines have been successfully demonstrated as intense neutron sources, where the neutrons are emitted as a result of deuterium-deuterium (D-D) or deuterium-tritium (D-T) thermonuclear fusion types of reaction. Such focus devices produce high neutron yield per shot and provide a well localized point source, which is very important in neutron radiography. In order to make neutron radiography more practical and popular, radiation hazards must be minimized as well as the construction and operation costs of the neutron source. Such source must also be easily movable and reliable. Although plasma focus devices may satisfy some of these conditions, they are still very bulky and unreliable, typical of high-power, short-pulse devices. Several decades ago, very low-dose neutrons from a discharge tube were produced by deuterium ions from discharge plasma striking a target surface of a cathode on which deuterium was absorbed as gas constituents. In recent years, a high-dose neutron source was developed based on a drive-in target principle by making use of an intense ion beam from particle accelerators. Neutron generation by such ion implantation is very reliable but still requires very bulky ion accelerators.

Also in recent years, there has been renewed interest in loading of deuterium atoms in palladium, under ambient-temperature conditions. The technique used for such loading of deuterium was to pass electrical current through an electrode immersed in a deuterated electrolyte. When the atomic ratio D/Pd of deuterium to palladium is considerably higher than unity, a substantial fraction of the bulk palladium is transformed into the $PdD_2$ crystal, where the nearest-neighbor distance between deuterium atoms is 0.94 angstrom.

It is therefore an important object of the present invention to provide a new high-dose neutron source, which makes use of plasma ion implantation and avoids the hazards and high costs of the aforementioned prior known methods, as well as bulkiness and other disadvantages associated therewith.

An additional object is to increase deuterium density inside a palladium rod by means of the plasma ion implantation technique to achieve a high concentration of the deuterium atoms.

SUMMARY OF THE INVENTION

A cylindrical palladium rod saturated by deuterium atoms and coated with a diffusion barrier material is immersed in a deuterium or tritium plasma confined to a grounded cylindrical chamber in accordance with one embodiment of the invention. The palladium rod is connected to a high power modulator, which provides a series of negative-voltage pulses. During the negative pulse, deuterium or tritium ions the palladium rod and collide with deuterium atoms therein to cause emission of neutrons. The apparatus associated with such a source of neutrons, useful for neutron radiography for example as aforementioned, is portable, very reliable and almost free from radiation hazards except for the neutrons. Further, steady-state operation is achieved to generate a continuous neutron flux with typical neutron production rate in the order of $10^{13}$ $sec^{-1}$. Once deuterium atoms are inside the palladium target they are trapped by a diffusion barrier coating. A prolonged implantation of deuterium ions will thereby increase deuterium concentration over the initial atomic ratio=0.6, which can be easily attainable without any pressurization.

In accordance with the invention, the aforementioned plasma is generated by discharge of thermionic filament current, while the ions falling into the target rod during the negative pulse is established as an increasing function of the applied voltage, the plasma density, target rod radius and the pulse duration. The plasma ions penetrating the target collide with deuterium or tritium atoms to achieve a desirable neutron production rate.

Optimum system parameters include: applied voltage= 100 kV, plasma density=$5\times10^9$ $cm^{-3}$, pulse duration=1 $\mu s$, pulse repetition rate=$10^5$ $sec^{-1}$, and the palladium target length=10 cm. Such system parameters ensure an average neutron production rate $<dN/dt> = 2.3\times10^{12}$ $sec^{-1}$ for D-T reaction. The neutron production rate for D-D reaction is two order of magnitude less than that for D-T reaction. As a result, saturation density of deuterium atoms in the palladium rod is proportional to the ion current and the diffusion-barrier thickness. As expected, the saturation density is inversely proportional to the diffusion coefficient and solubility of deuterium in the barrier material. Also, the final saturation density is independent of the initial deuterium density. Deuterium density profile inside the palladium rod is theoretically calculated, by making use of the rate equation and diffusion properties of deuterium atoms in palladium. Because of the small diffusion coefficient of deuterium atoms in palladium, the incoming ions do not diffuse quickly thereby piling up near the target surface.

According to calculations, the deuterium density in palladium can triple its original value within a few days of ion implantation for a reasonable target size.

Another most important feature of the present invention is elimination of the heat accumulated on the surface of the target. Liquid nitrogen as the coolant may keep the target surface temperature well below the allowable level. Any increase in deuterium concentration inside a palladium target over the initial value is obtained from predetermined operational limits. Other embodiments of the invention contemplate neutron generation by use of a lithium tritite target involving system parameters identical to those for a palladium target. The neutron production rate for the lithium tritide type target is considerably larger than that for the palladium target.

BRIEF DESCRIPTION OF THE DRAWING FIGURES

Other objects, advantages and novel features of the invention will become apparent from the following detailed description of the invention when considered in conjunction with the accompanying drawing wherein.

1 and a plot of the average penetration depth of the deuterium ions into a lithium deuteride type of target.

Figure 5:
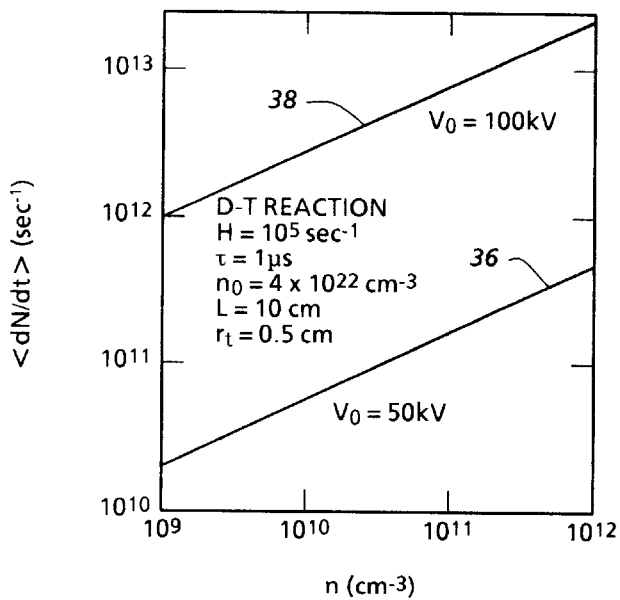

FIG. 5 is a graphical plot of average neutron production rate versus plasma density.

Figure 6:
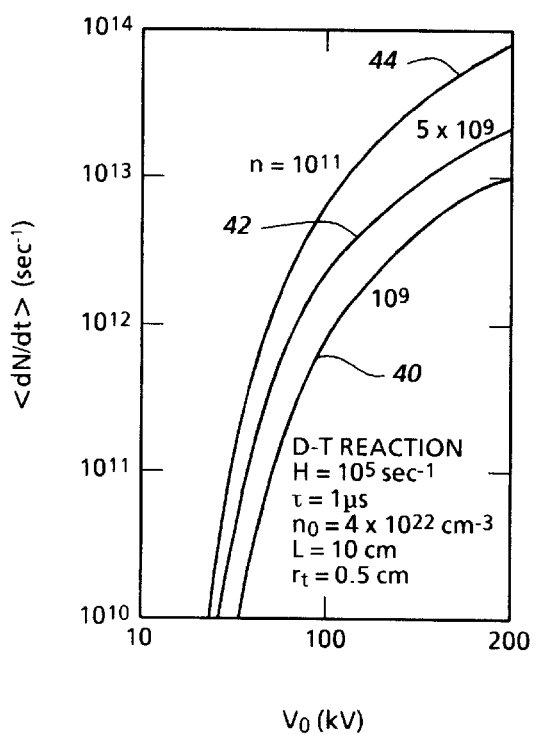

FIG. 6 is a graphical plot of average neutron production rate versus the biased voltage for several different values of plasma density.

Figure 1:
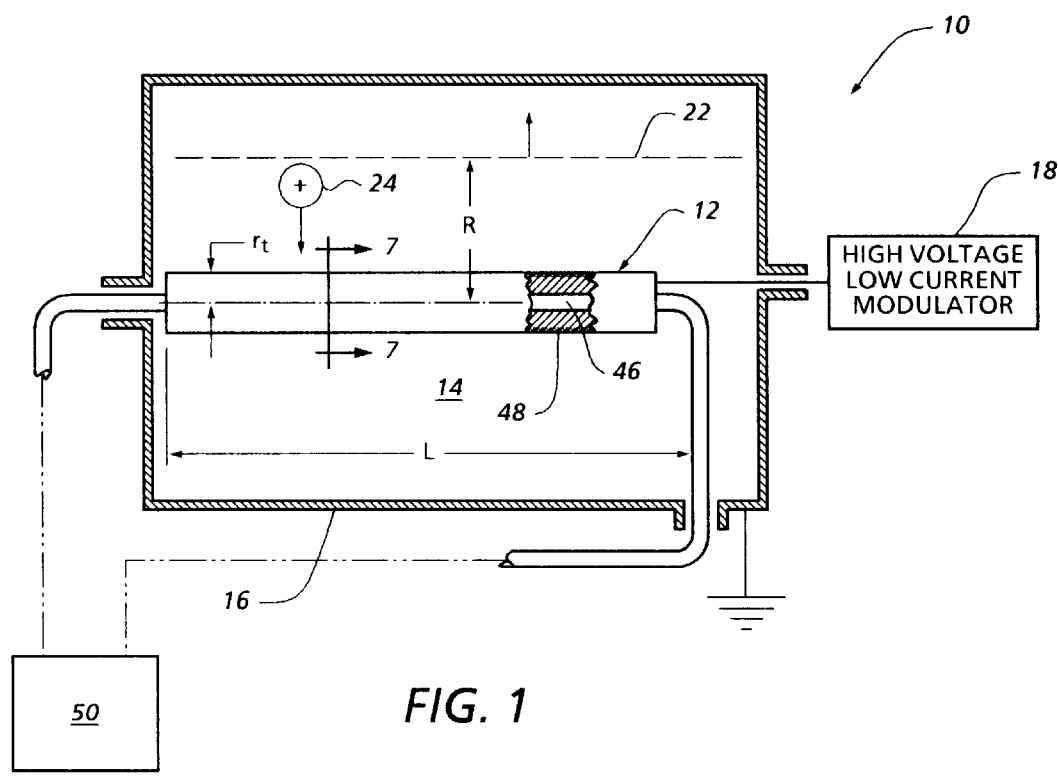
FIG. 1 is a schematic presentation of a neutron source in accordance with one embodiment of the invention.
Figure 7:
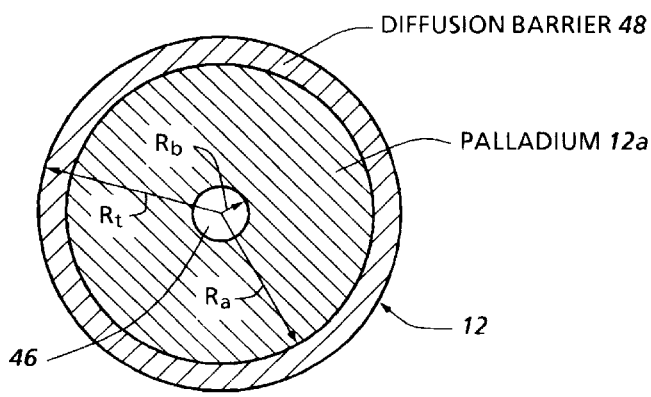

FIG. 7 is a section view taken substantially through a plane indicated by section line 7—7 in FIG. 1.

Figure 8:
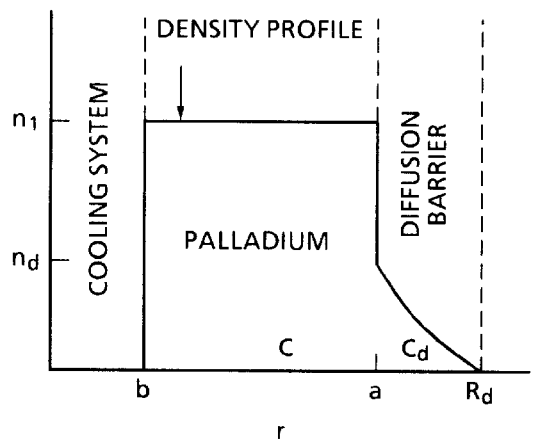

FIG. 8 is a schematic graphical presentation of the deuterium density across the radius of the target rod.

Figure 9:
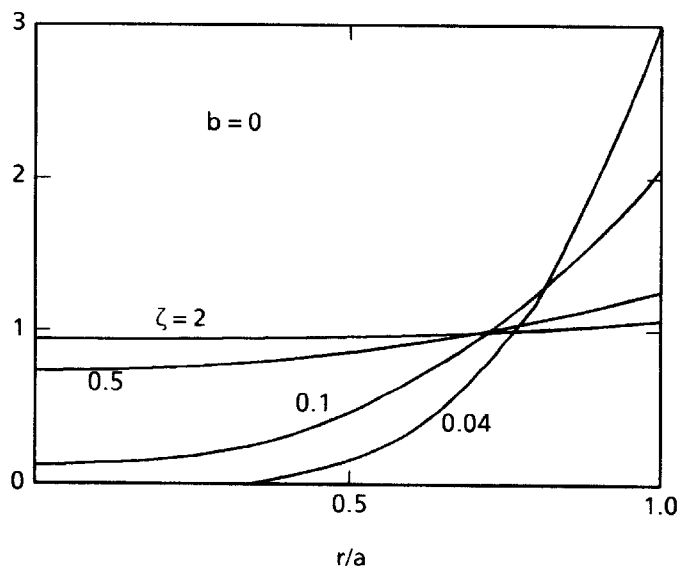

FIG. 9 is a graphical plot of the diffusion function of deuterium atoms in the palladium rod versus normalized radial coordinate for a solid rod.

Figure 10:
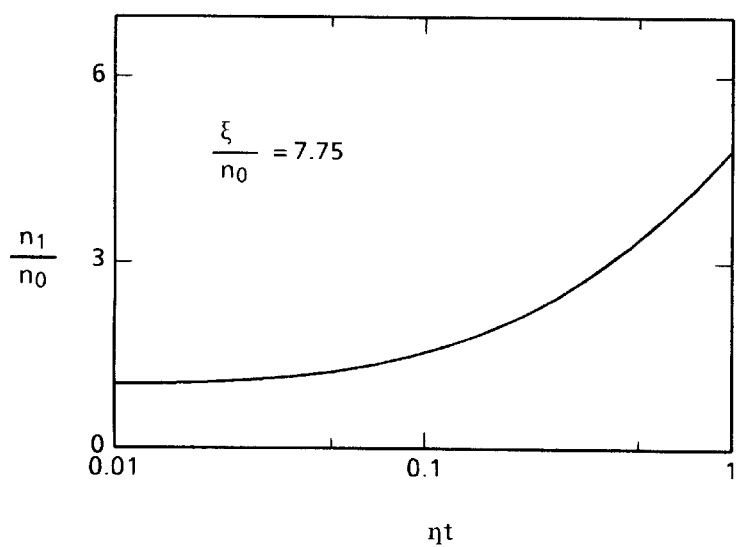

FIG. 10 is a graphical plot of the normalized deuterium density inside palladium versus the normalized time.

DETAILED DESCRIPTION OF THE PREFERRED EMBODIMENT

Figure 2:
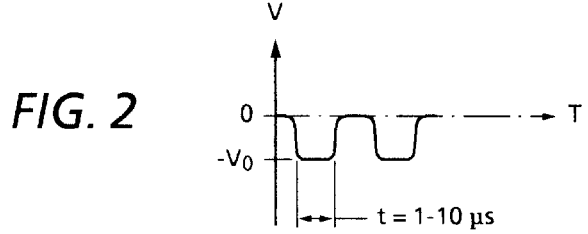
FIG. 2 is a graphical illustration of the negative voltage pulses applied to the plasma immersed target diagrammed FIG. 1.

Referring now to the drawing in detail FIG. 1 is a schematic presentation of a neutron source 10 in accordance with one embodiment of the invention, including a target in the form of a cylindrical palladium target rod 12 having a radius $r_t$. The target element or rod 12 is immersed in a deuterium or tritium plasma 14 which is confined to a grounded cylindrical chamber of a housing 16. The plasma having a density ranging from $10^9$ cm$^{-3}$ to $10^{12}$ cm$^{-3}$ and an electron temperature ranging from 2 eV to 10 eV is generated by either RF or glow discharge or by thermionic filaments. The palladium rod 12 is connected to a high-power modulator 18, which provides a series of 1–10 $\mu$s negative pulses 20 under an applied voltage $V_0$ ranging from 10–200 kV as diagrammed in FIG. 2. The palladium rod is soaked with deuterium atoms before being immersed into the plasma. The atomic ratio of deuterium to palladium (y=D/Pd) in palladium deuteride can easily reach 0.6 without pressurization. During the application of negative pulses 20 to the target 12, deuterium or tritium ions 24 will be injected into the palladium rod and will collide with deuterium atoms, thereby initiating fusion reaction and emitting neutrons. The fusion reaction depends on the applied voltage $V_o$ and the plasma density.

Figure 3:
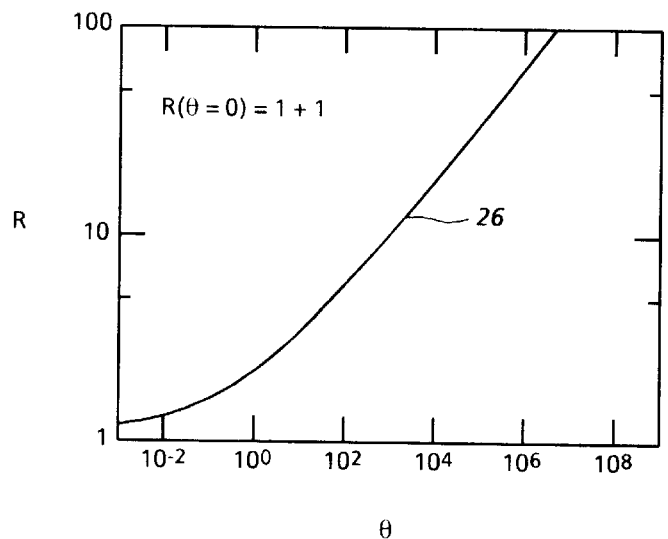
FIG. 3 is a graphical plot of normalized radius of the ion matrix sheath diagrammed in FIG. 1 versus the normalized time.

During application of a negative pulse 20 to rod target 12, electrons are repelled from the target on the time scale of the electron plasma frequency, leaving behind an ion matrix sheath 22 as diagrammed in FIG. 1, the dynamics of which has been studied extensively to estimate the number of incoming ions entering the target rod. The ion sheath further expands in time as the negative-voltage pulse 20 is sustained and the ions 24 uncovered by the sheath bombard the target as indicated diagrammatically in FIG. 1. During the negative voltage pulse, the ion sheath radius (R) expands, according to the differential equation.

$$\frac{dR}{d\Theta} = \frac{1}{R\beta^2(R)}, \tag{1}$$

where the parameters $$\theta = \frac{4\sqrt{2}}{9}A^{3/2}\omega_p t, \quad R = \frac{I}{I_t}, \quad A = \varepsilon_o \frac{V_o}{enr_t^2}, \tag{2}$$

and $\omega_p$ is the ion plasma frequency, $-e$ is the electron charge, $\epsilon_0$ is the permissivity of free space and n is the plasma density. From equation (1), the sheath radius R is determined in terms of time $\theta$, provided that the initial radius of the sheath at time t=O is known. The parameter $\beta(R)$ in Eq. (1) is a very complicated function assuming that the initial condition $R_{int}$=1.1 at $\theta$=O. Equation (1) has been solved numerically with the results presented as curve 26 in FIG. 3. From a careful examination of FIG. 3, it is found that the normalized ion sheath radius R is approximately related to the normalized time $\theta$ by $$R=1.7\theta^{8/29}, \tag{3}$$

for $\theta$>10, which can be easily satisfied for a broad range of physical parameters.

In order to obtain the extent of sheath propagation per pulse, it is assumed that at time t=O, a negative-voltage pulse 20 is applied to the target 12, repelling almost instantaneously the electrons around the target and creating the ion matrix sheath 22 with radius $r_o$. Then, the ion sheath expands in time scale of ion plasma frequency from $R_o=r_o/r_t$ at $\theta$=o to R=R($\theta$). The initial ion matrix sheath radius $R_o$ in cylindrical geometry is obtained from the equation $$R_o^2=[(2A)^{1/2}-1][(3A)^{1/3}+(½)], \tag{4}$$

where the parameter A is defined in Equation (2). The corresponding normalized time $\theta_0$ is calculated by substitution of $R_0$ into Equation (3) and is given as $\theta_0$=(0.588$R_0$)$^{29/8}$ which is valid for $R_0$>5. Denoting the pulse length as $\tau$, the normalized pulse time $\theta_f$ is given by equation:

$$\theta_f = \theta_0 + \frac{4\sqrt{2}}{9}A^{3/2}\omega_p\tau. \tag{5}$$

For the normalized radius $R_f$ of the final sheath extent, corresponding $\theta_f$ is then obtained from Equation (3).

For the deuterium or tritium plasma with a density in the order of $10^9$ cm$^{-3}$ or higher, the second term in the right-hand side of Equation (5) is much larger than the value of the parameter $\theta_0$ for the negative pulse length $\tau$>1 $\mu$s. From a practical point of view the first term in the right-hand side of Equation (5) is neglected. Therefore, substituting Equation (5) into Equation (3), one obtains the equation:

$$R_f=1.496(A^{3/2}\omega_p\tau)^{8/29}. \tag{6}$$

The final radius $r_f$ of the ion sheath extent is given by $r_f=R_f r_t$. For a relatively long pulse with $\tau$>1 $\mu$s, the normalized radius $R_f$ is much larger than unity. Thus, the average ion current $I_{ion}$ per pulse to target is approximated from the equation:

$$I_{ion} = \frac{enL\pi}{\tau}R_f^2 r_t^2, \tag{7}$$

where L is the length of the palladium rod 12 and n is the plasma density. Substituting Equations (2) and (6) into Equation (7), an expression is finally obtained for the average ion current as:

$$I_{ion}\tau = 2.24\pi eL\left(\frac{\varepsilon_o\tau}{\sqrt{em}}V_o^{3/2}\right)^{16/29}n^{13/29}r_t^{10/29}, \tag{8}$$

where m is the ion mass. Note from Equation (8) that the number of ions $I_{ion}\tau$ falling into the target during the pulse is an increasing function of the applied voltage $V_o$, the plasma density n, the target radius $r_t$ and the pulse duration $\tau$. However, the ion number $I_{Ion}\tau$ decreases as the ion mass increases. The assumptions made in deriving Equation (8) include the conditions that: (a) the parameter $\theta$ defined in Equation (2) must satisfy $\theta > 10$, (b) the normalized radius $R_0$ of the initial ion matrix sheath is larger than or comparable to five, i.e., $R_0 > 5$, and (c) the final normalized radius of the ion sheath is considerably larger than the initial radius, i.e., $R_f^2 >> R_o^2$, which is consistent with the assumption $\theta_f >> \theta_0$. Within the context of the foregoing assumptions, the target volume is also neglected in evaluating the current from Equation (8). Since the ion matrix sheath is formed before the ions 24 are able to move, the potential variation in the initial ion matrix sheath results in a variation in the energy of the collected ions from zero to the full target biased voltage. The fraction f of the low energy ions for cylindrical geometry is $f/=(R_0/R_f)^2$. This energy variation must be taken into account when estimating the fusion yield as well as target heating. However, in most of the practical cases the fraction f is less than a few percent. Modification of ion energy due to the fraction f, is therefore neglected.

The rate equation for the nuclear fusion during the pulse when the ions 24 are falling into the target 12 is given by the equation:

$$\frac{dN}{dt} = n_o \frac{I_{ion}}{e} \int_E^o \frac{\sigma(E')dE'}{(dE'/dx)}, \quad (9)$$

where $n_o$ is the number density of deuterium atoms inside the palladium rod, $\sigma(E)$ is the fusion cross section, N is the number of fusion reaction occurrences, E is the ion kinetic energy at the target surface, and (dE/dx) is the stopping power of the ions inside the target. The stopping power (dE/dx) is a very complicated function of the ion energy E in general. However, for present purposes it is assumed that the stopping power dE/dx is approximated by:

$$\frac{dE}{dx} = -\frac{E}{\Delta r}, \quad (10)$$

where $\Delta r$ is the average penetration depth of ions into the target.

The cross section $\sigma(E)$ of the nuclear fusion is expressed as:

$$\sigma(E) = \frac{a}{E}\exp(-45/\sqrt{E}), \quad (11)$$

where the cross section $\sigma$ is in barns, the ion energy E is in keV units, and the coefficient $\sigma$ is given by;

$$\sigma = \begin{cases} 164 \text{ for } D-D \text{ reaction} \\ 23000 \text{ for } D-T \text{ reaction} \end{cases} \quad (12)$$

Substituting Equations (10) and (11) into Equation (9) and carrying out straightforward algebra, the following approximate rate equation is obtained:

$$\frac{dN}{dt} = \frac{2}{45}\sqrt{E}\, n_o \frac{I_{ion}}{e}\sigma(E)\Delta r, \quad (13)$$

where use has been made of the assumption $$E << 2025. \quad (14)$$

The condition in Equation (14) may be easily satisfied for a broad range of physical parameters. One should also keep in mind that the cross section of the D-T reaction is two order of magnitude larger than that of the D-D reaction. Obviously, the number of fusion reactions during each pulse is expressed as $$\Delta N = 2\sqrt{E}\, n_o \sigma(E) I_{ion} \Delta r \tau / 45 e, \quad (15)$$

where the ion kinetic energy E at the target surface is in keV units.

Figure 4:
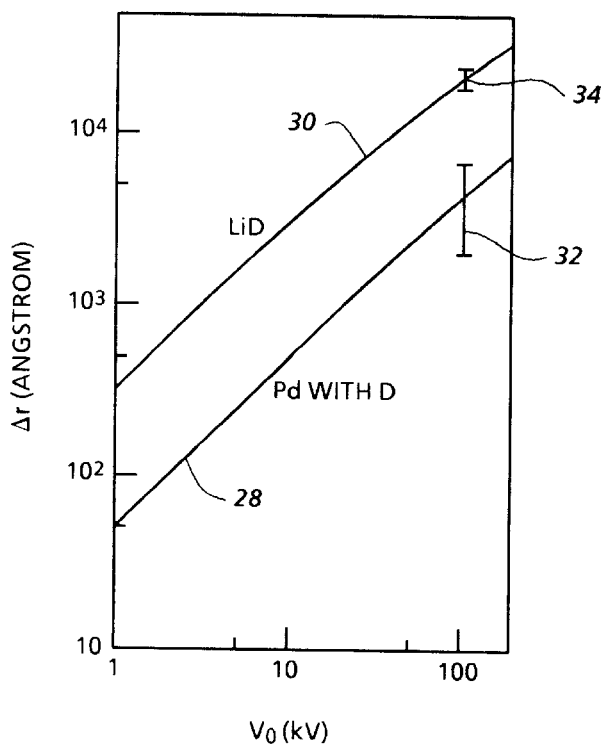
FIG. 4 is a graphical plot of the penetration depth of deuterium ion into a palladium target as diagrammed in FIG.

The average penetration depth $\Delta r$ of ions 24 of deuterium has been calculated by using the simulation code called TRIM88. FIG. 4 presents plot 28 of $\Delta r$ versus the deuterium ion energy for the deuteride palladium rod 12 with D/Pd=0.6. Also shown in FIG. 4 is a plot 30 of the average penetration depth of the deuterium ions into the lithium deuteride (LiD) crystal, as a comparison. The specific weight of palladium is much larger than that of the lithium deuteride. Thus, the penetration depth of the deuterium ions into the lithium deuteride target is much larger than that into the palladium target 12. The marked ranges made by vertical lines 32 and 34 at the biased voltage $V_o=100$ kV in FIG. 4, represent samples of the longitudinal straggling range as the ions penetrate into the target. Most of the ions after penetration are deposited within these marked ranges. From a careful examination of FIG. 4, $\Delta r$ in the palladium target may be approximated as:

$$\Delta r = 64 V_o^{0.9}, \quad (16)$$

for $1 \text{ kV} < V < 200 \text{ kV}$, where $\Delta r$ is in the angstrom unit and $V_o$ is in the unit of kV. The penetration depth of the tritium ions into the deuterium-soaked palladium is very similar to Equation (16).

By way of example, the palladium rod 12 is soaked by deuterium atoms with density of $n_o = 4 \times 10^{22}$ atoms cm$^{-3}$ and is negatively biased to plasma with biased voltage $V_o = 20$ kV per pulse. As aforementioned, the palladium number density corresponding to the deuterium target density $n_o = 4 \times 10^{22}$ cm$^{-3}$ (D/Pd=0.6), is $6.8 \times 10^{22}$ cm$^{31\ 3}$. The plasma density is $n = 5 \times 10^9$ cm$^{-3}$ while the voltage $V_o$ and plasma density n given in this example are very conservative values. In reality, these $V_o$ and n values can be easily enhanced by a factor of five or more in magnitude. The pulse length is assumed to be $\tau = 1$ $\mu$s while the radius and length of the palladium rod are $r_t=0.5$ cm and $L=10$ cm, respectively. Under these conditions, the parameter A in Equation (2) is found to be A=7.2. According to Equation (16), the penetration depth $\Delta r$ of the ions with energy of 20 keV into the palladium is typically $\Delta r = 10^{-5}$ cm. For simplicity in subsequent analysis, the number of pulses per second is represented as H, which depends on properties of the high-voltage, low-current modulator 18 connected to the palladium rod 12 as diagrammed in FIG. 1.

For deuterium plasma, the ion plasma frequency is given by $\omega_p = 6.3 \times 10^7$ rad/sec for $n = 5 \times 10^9$ cm$^{-3}$. The parameters $\theta_f$ in Equation (5) and $R_f$ in Equation (3) are calculated to be $\theta_f \times 760$ and $R_f=10$ for $\tau=1$ $\mu$s. Substituting these numbers into Equation (7), the average ion current $I_{ion}=0.6$ ampere is obtained. For E=20 keV, the fusion cross section $\sigma$ for a deuterium-deuterium reaction is given by $\sigma=3.5\times10^{-28}$ cm$^2$. Such fusion reaction has two branches i.e.,

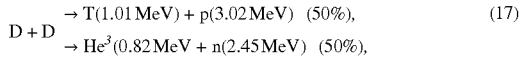

where D and T represent deuterium and tritium, p and n represent proton and neutron, and $He^3$ represents helium with mass number 3. Based on all of the foregoing information, for a 1 µs pulse with $I_{Ion}$=0.6 ampere and $\Delta r=10^{-5}$ cm, the number of fusion occurrences is 112, where 56 of them have helium and neutron by-products, and 56 of them have tritium and proton by-products. Thus, the neutron flux per unit time <dN/dt> is estimated to be <dN/dt>=5.6× $10^{-5}$ neutrons per sec for $H=10^4$ $sec^{-1}$ and <dN/dt>=28 millions per sec for $H=5\times10^5$ $sec^{-1}$.

For the tritium plasma, the ion plasma frequency is $\omega_p=5.1\times10^7$ rad/sec. The parameters $\theta_f$ and $R_f$ are given by $\theta_f=620$ and $R_f=9$ for $\tau=1$ µs. Thus, the average ion current is $I_{ion}=0.5$ ampere. The cross section σ of the deuterium-tritium reaction is two order of magnitude larger than that for the deuterium-deuterium fusion reaction. Therefore, the fusion cross section for D-T reaction is given by $\sigma=4.9\times10^{-26}$ $cm^2$ for E=20 keV. Substituting all of such information into Equation (15), the average neutron flux per unit time <dN/dt>=0.12 billions $sec^{-1}$ and <dN/dt>=6.4 billions $sec^{-1}$ for $H=5\times10^5$ $sec^{-1}$. To complete the theory, consider the D-T fusion reaction:

$$D+T \rightarrow He^4(3.5 \text{ MeV}) + n(14.1 \text{ MeV}). \quad (18)$$

In order to demonstrate the effects of the plasma density on the neutron generation, plots 36 and 38 of the average neutron generation from the D-T reaction per unit time <dN/dt> versus the plasma density n in FIG. 5 are obtained from Equations (8), (11), and (12) and (16) for the pulse length $\tau=1$ µs, the pulse repetition rate $H=10^5$ $sec^{-1}$, the target radius $r_t=0.5$ cm, the target length L=10 cm and several different values of the biased voltage $V_0$. As expected, the neutron flux per unit time increases with the increasing values of the plasma density and of the biased voltage. Substituting the parameter A in Equation (2) into Equation (6), the final radius $r_f$ of the ion sheath extent at the end of each pulse is found to be inversely proportional to the eight-twentyninths of the plasma density i.e., $r_f \approx n^{-8/29}$. Thus, the over-all physical size of the system may decrease as the plasma density increases.

Shown in FIG. 6 are plots 40, 42 and 44 of the average neutron generation from the D-T reaction per unit time <dN/dt> versus the biased voltage $V_0$ obtained from Equations (8), (11), (12) and (16) for $\tau=1$ µs, $H=10^5$ $sec^{-1}$, $r_t=0.5$ cm, L=10 cm and several values of the plasma density n. The neutron production rate increases drastically as the biased voltage increases from zero to $V_o=100$ kV for a broad range of plasma density. In this context, the most reasonable choice of system parameters may be $V_o=100$ kV, $n=5\times10^9$ $cm^{-3}$, $\tau=1$ µs and $H=10^5$ $sec^{-1}$, which ensures that the neutron production rate <dN/dt>=2.3×$10^{12}$ $sec^{-1}$ for L=10 cm. Under such conditions, Equations (6) and (8) indicate that the normalized radius of the ion sheath extent at the end of a pulse 20 is $R_f=34$ and the average ion beam current during the pulse is $I_{ion}=1.9$ ampere. Assuming the target radius $r_t=0.5$ cm, a plasma with a density of $5\times10^9$ $cm^{-3}$ and with radius of $r_f=17$ cm. is readily produced. The ion beam power during the pulse is p=190 kW while the average ion beam power is 19 kW assuming $\tau=1$ µs and $H=10^5$ $sec^{-1}$ made available through existing modulator technology. The neutron production rate <dN/dt>=2.3×$10^{12}$ $sec^{-1}$ is probably more than enough for most applications while the neutron production rate is proportional to the palladium target length L and increases with increasing value of the target radius. Thus, it is recommended that the target length and radius be increased where the desired neutron production is to be more than $2.3\times10^{12}$ $sec^{-1}$.

An important factor in the neutron production by the palladium target 12 as hereinbefore described, is the influence of temperature effects on the deuterium concentration inside the palladium. According to certain experimental measurements, the deuterium density inside the palladium target decreases drastically to zero as the target temperature increases from 343° Kelvin (K) to 383° K under one atmospheric deuterium pressure environment. Such characteristic behavior originates obviously from the exothermicity associated with hydrogen-palladium lattice bonding. Therefore, it is extremely important that the target temperature be below 343° K, in order to maintain the atomic ratio of deuterium to palladium close to 0.6. To dissipate the heat being accumulated on the target from ion implantation, bore 46 is formed along the axis of the palladium target rod 12 as shown in FIG. 1 to conduct a flow of a coolant such as liquid nitrogen or chilled water. The coolant in bore 46 may be circulated under control of a suitable system 50 as diagrammed in FIG. 1. The heat deposited on the target surface is transferred to the heat absorbing fluid according to the thermal conductivity relationship:

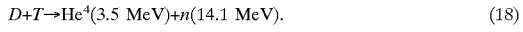

where Q/t is the heat energy transfer per second, K is the conductivity, a is the cross section of the conducting material, d is the distance between the target surface (heat source) and coolant (heat sink), and $T_1$ and $T_2$ are temperatures at heat sink and heat source, respectively. It is assumed that a palladium rod with radius of 0.5 cm and with conductivity of K=0.8 has a cylindrical shaped bore 46 with radius of 0.3 cm cut along the axis.

Liquid nitrogen as the fluid with a temperature of $T_1=78°$ K may be circulated through the bore. Assuming that $V_0=100$ kV, $n=5\times10^9$ $cm^{-3}$, $\tau=1$ µs, $H=10^5$ $sec^{-1}$, and L=10 cm, it was found $I_{Ion}=1.9$ ampere, Q/t=19 kW as previously described. The values for a and d are also approximately evaluated to be: $a=24$ $cm^2$ and d=0.2 cm. Substituting all of such values into Equation (19), the temperature $T_2$ is determined as 228° K on the surface of the palladium rod, which is lower than the aforementioned deuterium-discharge temperature of 343° K. Thus, by circulation of liquid nitrogen as the coolant conducted through bore 46 in the palladium rod the heat deposited by the ion implantation is dissipated fast enough to meet the temperature requirement.

A prolonged implantation of deuterium ions obtainable by ordinary charging methods such as electrolysis, increases deuterium concentration inside palladium over the atomic ratio D/Pd=0.6. However, increasing the ratio D/Pd above 0.6 is also accompanied by a sharp increase in deuterium pressure. Studies on palladium-hydrogen systems reveal that hydrogen (or deuterium) pressure is generally an exponential function of its content in the lattice as indicated by an empirically determined formula:

$$\ln[p(D)_2] = -\alpha(T) + \beta(T)Y, \quad (20)$$

which relates the pressure p (up to one atm) to the deuterium concentration. In Equation (20), α(T) and β(T) are temperature-dependent coefficients. Extrapolation of Equation (20) to high pressure regions indicates that at room temperature, a million atmospheric deuterium pressure is needed to increase the atomic ratio D/Pd from 0.6 to one. Thus, if the ion implantation method increases the D/Pd value much higher than 0.6, part of the trapped deuterium should be discharged from the palladium surface to maintain the equilibrium condition, thereby generating duterium gas.

The rate of discharge of the absorbed deuterium from the palladium surface may be decreased by coating the deuterium-saturated palladium with a thin layer 48 of material having a low diffusivity and a low solubility for deuterium as diagrammed in FIG. 1. Such a coating should impede the outward diffusion of the deuterium atoms, forming a diffusion barrier. Diffusion constant and solubility of deuterium in some host materials are summarized in the following Table:

TABLE

Diffusion constant and solubility of hydrogens in various metals at room temperature.

| Metal | D (cm$^2$ sec$^1$) | C (gm atom cm$^{-3}$) |
|---|---|---|
| PD | $3 \times 10^{-7}$ | $3 \times 10^{-4}$ |
| Ni | $1 \times 10^{-9}$ | $1 \times 10^{-5}$ |
| Fe | $6 \times 10^{-5}$ | $4 \times 10^{-9}$ |
| Fe—Ni Alloy | $1 \times 10^{-10}$ | $4 \times 10^{-6}$ |
| Fe$_2$O$_3$ | $1 \times 10^{-18}$ | |
| Cr$_2$O$_3$ | $9 \times 10^{-16}$ | |

The alloy in the table consists of 60% of iron and 40% of nickel in weight. A good candidate for the barrier material of layer 48 is an alloy of 60% of iron (Fe) and 40% of nickel (Ni) in weight, whose diffusion constant and solubility are much less than those for palladium. According to FIG. 4 or Equation (16), a desirable thickness of the barrier coating layer 48 was found to be less that $10^3$ angstrom. The barrier would be most effective when the heat generated by ion implantation is quickly dissipated. With the neutron production rate pursuant to Equation (15) being proportional to the deuterium atomic density $n_o$ in a target, the deuterium target density is greatly enhanced by means of the diffusion barrier, thereby further improving neutron yield. With prolonged plasma ion implantation, there is a possibility that the diffusion-barrier coating layer may erode either by incoming ions or by local electrical discharge at the target surface. Sputtering of the barrier coating in the plasma ion implantation, on the other hand, is significantly less than with conventional ion implantation because of the normal impingement of the ions on the target surface. Nevertheless, the barrier coating should be reinforced occasionally for prolonged implantation. In order to maintain the D-T reaction, the palladium rod is soaked with deuterium and tritium atoms and immersed in a deuterium and tritium plasma with deuterium to tritium atomic ratio of unity. Special care must be taken in use of the tritium plasma because of its hazardous characteristic.

The increase of the density ratio by use of the barrier layer 48 does not necessarily enhance the probability of a piezonuclear fusion. The yield strength of solid palladium in the target rod 12 should prohibit any unrealistic pressure rise inside the lattice. In addition, it has been shown that the rate of piezonuclear fusion would be extremely low. For example, the D-D fusion rate at pressure near $10^9$ atm is only 0.07 cm$^{-3}$ min$^{-1}$. If an increase in deuterim concentration in palladium raises the fusion cross section beyond the value calculated from Equations (11) and (12), then a non-equilibrium effect must play a pivotal role in a fusion reaction, which is not as yet fully understood. A sudden influx of deuterium atoms into the already saturated palladium could cause a sharp local pressure surge, resulting in strong internal stresses. Under these stresses, cracks could be developed and propagated, further enhancing local effects such as charge separation. Despite the present speculative understanding of the fusion mechanism involved, the effect of a high internal pressure on enhancing fusion probability seems to provide a partial explanation for the solid state fusion result as heretofore reported in connection with a large size palladium rod, 2 cm in diameter and 5 cm long. A thin palladium wire or foil cannot attain a high internal pressure due to the lattice volume expansion, which provides a release mechanism for the energy contributed by the internal stresses.

Continuous ion implantation increases the deuterium number density n inside palladium over its initial value $n_0$. The deuterium density increase per second due to the ion implantation is given by $(I/neL)/(a^2-b^2)$, where I is the average deuterium-ion current impinging into the target. Shown in FIG. 7 is the cross section of palladium rod 12 while FIG. 8 is a schematic presentation of the deuterium density across the radius of the cross section. The outer radius of the target rod 12 and the diffusion barrier 48 is denoted by $R_r$. The deuterium density inside palladium body 12*a* is represented by $n_1$. According to the equilibrium condition, the deuterium density $n_d$ at the inner surface of the diffusion barrier (the interface between palladium and barrier material), r=a, is given by $$n_d = \frac{C_d}{C} n_1, \quad (21)$$

where C and $C_d$ are solubility of deuterium in palladium and diffusion-barrier material, respectively. Note from Equation (21) that the deuterium density $n_d$ in the barrier is much less than that in palladium if the solubility ratio $C_d/C$ is much less than unity, which is a typical feature of the barrier material. The deuterium density inside the diffusion barrier ($a<r<R_d$) is expressed as $$n(r) = n_d \frac{\ln(R_d/r)}{\ln(R_d/a)}. \quad (22)$$

The flux $\Gamma$ of deuterium atoms leaking through the diffusion barrier is given by $$\Gamma(r) = \frac{D_d}{\ln(R_d/a)} \frac{n_d}{r}, \quad (23)$$

where $D_d$ is the diffusion coefficient in the diffusion-barrier material. Since the diffusion-barrier thickness is much less than the target radius, $\ln(R_d/a)$ is approximated by $(R_d-a)/a$.

The net gain of the deuterium number density per unit time in palladium is given by $$\frac{dn_1}{dt} = \frac{I/e}{\pi L(a^2 - b^2)} - \eta n_1, \quad (24)$$

where the diffusion-loss parameter $\eta$ is defined by $$\eta = 2\frac{D_d C_d}{C \ln(R_d/a)(a^2 - b^2)}. \quad (25)$$

Defining the saturation density $\xi$ by $$\xi = \frac{IC\ln(R_d/a)}{2e\pi LD_dC_d}, \quad (26)$$

and assuming that the initial deuterium density in the palladium rod is $n_0$, we integrate Equation (24) over time t and the result is given by $$n_1(t) = \xi - (\xi - n_0)\exp(-\eta) \quad (27)$$

Several points are noteworthy from Equation (27). First, the saturation density $\xi$ of deuterium atoms in the palladium rod is proportional to the ion current I and the diffusion-barrier thickness $\ln(R_d/a)$. Second, as expected, the saturation density $\xi$ is inversely proportional to the diffusion coefficient $D_d$ and solubility $C_d$ of deuterium in the barrier material. However, the saturation time $(1/\eta)$ is also inversely proportional to the diffusion coefficient and solubility of the deuterium atoms in the barrier material. Third, the final saturation density is independent of the initial deuterium density $n_0$.

For a relatively short ion implantation time characterized by $\eta t < 1$, the deuterium density $n_1(t)$ in Equation (27) is approximated by $$n_1 = n_0 + \frac{(I/e)t}{\pi L(a^2 - b^2)}. \quad (28)$$

In reality at ambient temperature, the diffusion coefficient of deuterium atoms in palladium is rather small, and the incoming ions do not diffuse quickly through palladium, thereby piling up near the outer surface of the target. Assuming that the inner hole is negligibly small (i.e., b=0), the deuterium density inside the palladium rod is given by $$n(r, t) = n0 + \frac{(I/e)t}{\pi a^2 L}F(\zeta, r/a), \quad (29)$$

where the diffusion function $F(\zeta, r/a)$ of deuterium atoms in the palladium rod is defined by $$F(\zeta, r/a) = 1 + \sum_n \frac{J_0(a_n)J_0(a_n r/a)}{a_n^2 J_2^2(a_n)\zeta}[1 - \exp(-a_n^2\zeta)]. \quad (30)$$

In Equation (30), $J_l(x)$ is the Bessel function of the first kind of order l, $\alpha_n$ is the nth root of $J_1(\alpha_n)=0$, the normalized time $\zeta$ is defined by $\zeta=Dt/a^2$ and D is the diffusion coefficient of deuterium atoms in palladium. The terms proportional to the Bessel functions in the right hand side of Equation (30) are related to the transient solutions which vanish at infinite time. Shown in FIG. 9 are plots of the diffusion function F of deuterium atoms versus normalized radial coordinate r/a obtained from Equation (30) for a solid palladium rod with b=0. Obviously, the incoming deuterium atoms diffuse inward slowly with time. Therefore, the incoming deuterium atoms are piling up near the target surface at the beginning of the implantation. Eventually, the solution in Equation (29) recovers the approximate solution in Equation (28) at t→∞. As shown in FIG. 5, the deuterium density in Equation (29) approaches the uniform density approximation in Equation (28) for time $\zeta > 0.1$, which is the case of most practical applications. Also, the average value of Equation 29 over the Palladium rod is identical to the density in Equation (28) for b=0, as expected.

From Equation (27), the saturation density $\xi$ is independent of the radius of bore 46, although saturation time $(1/\eta)$ is a definite function thereof. FIG. 10 is a plot of the normalized deuterium density $n_1/n_0$ versus the normalize time $\eta t$ obtained from Equation (27) for $\xi/n_0 = 7.75$, which corresponds to $\xi=3.1\times10^{23}$ cm$^{-3}$ and $n_0=4\times10^{22}$ cm$^{-3}$. The initial deuterium number density of $n_0=4\times10^{22}$ cm$^{-3}$ corresponds to the atomic ratio D/Pd=0.6 of deuterium to palladium. As shown in FIG. 10, a considerable density buildup of deuterium atoms by a plasma ion implantation occurs when the normalized implantation time $\eta t$ is longer than 0.1.

Chemical Vapor Deposition (CVD) is one established method of obtaining overlay coatings 48. The temperature of deposition is often critical and may be impaired by high temperature of the bulk chemical vapor. In accordance with the present invention, plasma-assisted chemical vapor deposition is found to be more useful in providing coatings 48 at temperature much lower than is possible by the known corresponding CVD method. Both techniques to coat the palladium rod after the rod is soaked in a pressured deuterium-gas environment is contemplated.

For the prolonged plasma ion implantation, there is a possibility that the diffusion-barrier coating may erode either by incoming deuterium ions or by local electrical discharge at the target surface. By adding a small amount of iron and nickel into the deuterium plasma, and depositing iron and nickel ions on the surface of the target, it may be possible to continuously mend the worn-out portion of the barrier coating. Since the iron and nickel ions are very heavy in comparison with the deuterium ions, most of the iron and nickel ions are stopped by the barrier.

The dynamics of the ion sheath as hereinbefore set forth is valid only for negative voltage pulses with zero rise time. If the rise time of the voltage pulse is greater than the electron response time, the voltage waveform must be taken into account in describing the dynamics of the ion sheath. The typical electron response time is the period of the electron plasma oscillation, which is 2.5 as for the plasma density of $n=5\times10^9$ electrons cm$^{-3}$. Obviously, the voltage wave form with a non-zero rise time will modify the ion beam current estimated in Equation (7). However, such modification of the negative voltage pulses 20 is not enough to redefine the feasibility of the neutron source scheme hereinbefore described.

The secondary electrons emitted from the target 12 as a result of bombardment by ions 24 are accelerated through the sheath 22 toward the wall of the vacuum chamber housing 16. The current contributed by these secondary electrons are comparable with or sometimes greater than the ion current. The x-ray radiation produced by the impact of the high energy electrons on the housing walls is not negligible. Assuming that the secondary electron current with energy 100 keV is in the order of 100 milliamperes, the thickness of the wall of housing 16 made of iron must be larger than 0.5 cm, in order to provide a shield against possible x-ray leakage. A chamber housing wall of 0.5 cm thick iron or a few cm thick aluminum, is almost transparent for neutrons emitted from the target.

Finally as another embodiment, the invention covers use of lithium deuteride or lithium tritide crystal as the target. For the implantation of tritium or deuterium ions into a LiD target, the penetration depth is almost the same for any set of impinging ions and target material. Thus, in the latter case, the penetration depth $\Delta r$ is approximately expressed as $$\Delta r = 465 V_o^{0.82}, \quad (31)$$

where $\Delta$ is in the angstrom unit and $V_0$ is in the unit of kV. In the latter embodiment, lithium tritide crystal is laid on the surface of a copper tube functionally equivalent to the bore 46 in the palladium rod 12. A typical thickness of the lithium tritide crystal into which deuterium ions impinge, is less than 1 mm. As a safety precaution, tritium atoms are preferably used as the target component rather than plasma ions. Assuming that the applied biased voltage $V_o$=100 kV, from Equation (31) it is determined that the penetration depth of the deuterium ions into the lithium crystal of the target element is 2.03 $\mu$m which is about 5 times larger than that into the palladium rod as the target element. Note that the lithium tritide crystal with atomic weight of 10 and specific weight of 1.02 gram cm$^{-3}$ has the atomic number density of $6.2 \times 10^{22}$ cm$^{-3}$, which is also the tritium target density $n_o$. Thus, for $V_o$=100 kV, n=$5 \times 10^9$ cm$^{-3}$, $n_o$=$6.2 \times 10^{22}$ cm$^{-3}$, $\tau$=1 $\mu$s, H=$10^5$ sec$^{-1}$, $r_t$=0.5 cm and L=10 cm, the neutron production rate is <dN/dt>=$1.8 \times 10^{13}$ sec$^1$ at the LiT target. The neutron production rate from LiT target is considerably higher than that from a palladium target. Since the melting point of the lithium tritide crystal is 680° Celsius, the heat deposited on the crystal surface by the ion implantation can be eliminated by water cooling through the copper tube. However, the lithium tritide crystal is a dielectric material, which may build up a space charge potential on the target surface after a prolonged implantation. This space charge potential may cancel the negative-biased voltage $V_o$, thereby preventing ions from falling into the target. In order to eliminate this troublesome space charge build up, electrical conductivity of the crystal is increased by making a composite of LiT and copper. The presence of a small amount of copper inside the lithium tritide crystal could increase the electrical and thermal conductivities. Any charge buildup on the target may also be neutralized by the plasma between the high voltage pulses.

In conclusion steady-state, high-dose neutrons may be generated pursuant to the present invention for various applications including calibration, detection and neutron radiography. The high-dose neutron source so created makes use of plasma ion implantation, which consists of the cylindrical target rod 12 soaked by deuterium atoms and immersed in the deuterium or tritium plasma. The plasma is confined to a grounded conductive chamber housing 16. The palladium target rod 12 is connected to a high-power modulator 18, which provides a series of negative-voltage pulses 20. During these negative pulses, deuterium or tritium ions 24 impinge into the palladium rod and collide with deuterium atoms in it, initiating fusion reaction and emitting neutrons. A most reasonable choice of the system parameters includes an applied voltage $V_o$=100 kV, plasma density=$5 \times 10^9$ cm$^3$, pulse duration=1 $\mu$s, pulse repetition rate=$10^5$ sec$^{-1}$, and palladium target length=10 cm. Under such conditions, an average neutron production rate <dN/dt>= $2.3 \times 10^{12}$sec$^{-1}$ for D-T reaction is achieved which is probably more than enough for most applications. The neutron production rate for D-D reaction is two order of magnitude less than for D-T reaction.

Further, in accordance with the present invention the deuterium density inside a palladium target is increased considerably. A large size palladium sample loaded with a high concentration of deuterium atoms is very useful for research on the solid-state fusion and electrochemistry for example. The deuterium-enrichment in palladium achieved makes use of the plasma ion implantation as hereinbefore described to increase deuterium concentration over the initial density $n_0$=$4 \times 10^{22}$ cm$^{-3}$, which can be easily attainable even without pressurization. In a high-pressure environment of deuterium gas, the initial density can be higher than the foregoing value. Deuterium density increase over its initial value may be expressed in terms of diffusion coefficient and thickness of the barrier material to provide a deuterium density profile inside the palladium rod by use of the rate equation and diffusion properties of deuterium atoms in palladium. Due to the small diffusion coefficient, the incoming ions do not diffuse quickly, thereby piling up near the target surface.

Numerous other modifications and variations of the present invention are possible in light of the foregoing teachings. It is therefore to be understood that within the scope of the appended claims the invention may be practiced otherwise than as specifically described.

What is claimed is:

1. A device for producing neutrons, comprising an electrically conductive chamber within which a body of plasma gas is confined, a target element, means for operatively positioning within said chamber the target element loaded with atoms of deuterium, means for extracting reactive ions from the body of the plasma gas in surrounding relation to the loaded target element; and electrical pulse applying means connected to the target element for enhancing collision of the extracted reactive ions with the atoms of deuterium in the target element to cause emission of the neutrons under steady-state conditions, said target element being made of palladium penetrated by the reactive ions and said body of plasma gas being tritium, said means for extracting the reaction ions including: a voltage source applying a voltage of approximately 100 kv to the target element in said body of the plasma gas at a density of approximately $5 \times 10^9$ cm$^3$.

2. The device as defined in claim 1 wherein the electrical pulse applying means produces negative pulses applied to the target element at a repetition rate of $10^5$ sec$^{-1}$ and pulse duration of 1 $\mu$s.

3. A device for producing neutrons, comprising an electrically conductive chamber within which a body of plasma gas is confined, a target element, means for operatively positioning within said chamber the target element loaded with atoms of deuterium, means for extracting reactive ions from the body of the plasma gas in surrounding relation to the loaded target element; electrical pulse applying means connected to the target element for enhancing collision of the extracted reactive ions with the atoms of deuterium in the target element to cause emission of the neutrons under steady-state conditions, said target element being made of palladium penetrated by the reactive ions, the target element being a cylindrical rod having an axial length of 10 cm and electrons repelled from the target element in response to said collision therewith of the reactive ions forming an ion matrix sheath encircling the target element.

4. The device as defined in claim 3 wherein said ion matrix sheath radially expands about the target element when initially formed during each of the negative pulses.

5. The device as defined in claim 4 including cooling means connected to the target element for dissipation of heat generated within the target element at a rate maintaining the target element below 343° K in temperature.

6. A device for producing neutrons, comprising an electrically conductive chamber within which a body of plasma gas is confined, a target element, means for operatively positioning within said chamber the target element loaded with atoms of deuterium, means for extracting reactive ions from the body of the plasma gas in surrounding relation to the loaded target element; electrical pulse applying means connected to the target element for enhancing collision of the extracted reactive ions with the atoms of deuterium in the target element to cause emission of the neutrons under steady-state conditions, and electrons repelled from the target element in response to repulsive force forming an ion matrix sheath encircling the target element, said pulse applying means producing negative pulses applied to the target element causing radial expansion of the ion matrix sheath formed during each of said negative pulses.

7. A device for producing neutrons, comprising an electrically conductive chamber within which a body of plasma gas is confined, a target element, means for operatively positioning within said chamber the target element loaded with atoms of deuterium, means for extracting reactive ions from the body of the plasma gas in surrounding relation to the loaded target element; electrical pulse applying means connected to the target element for enhancing collision of the extracted reactive ions with the atoms of deuterium in the target element to cause emission of the neutrons under steady-state conditions, said target element being made of palladium penetrated by the reactive ions; and a coating of diffusion barrier material on the target element reducing discharge therefrom of the atoms of deuterium.

8. A method of concentrating atoms of deuterium at a saturation density within a body, including the steps of: soaking the body in the atoms of deuterium; coating the body with a diffusion barrier material; immersing the coated body in a deuterium plasma; and inducing ion implantation of reactive ions from the plasma into the coated body causing diffusion and pile up of the ions within the body adjacent a surface portion thereof, said step of inducing prolonged ion implantation including: charging said body with negative electrical energy pulses; and cooling the body at a rate maintaining the temperature thereof below 343° K.

* * * * *